(12) United States Patent
Meyers et al.

(10) Patent No.: US 7,176,943 B2
(45) Date of Patent: Feb. 13, 2007

(54) INTELLIGENT WINDOWS BUMPING METHOD AND SYSTEM

(75) Inventors: Brian Meyers, Bellevue, WA (US); Tim Regan, Sammamish, WA (US); Greg Smith, Bellevue, WA (US); Mary Czerwinski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 98 days.

(21) Appl. No.: 10/608,462

(22) Filed: Jun. 27, 2003

(65) Prior Publication Data

US 2004/0066408 A1 Apr. 8, 2004

Related U.S. Application Data

(60) Provisional application No. 60/417,085, filed on Oct. 8, 2002.

(51) Int. Cl.
*G09G 5/00* (2006.01)
*G09G 3/04* (2006.01)

(52) U.S. Cl. .................. 345/619; 345/40; 345/1.1; 345/672; 715/798; 715/799

(58) Field of Classification Search ............... 345/1.11, 345/1.2, 33, 40, 672, 1.1, 619; 715/715, 715/717, 794, 798, 799
See application file for complete search history.

(56) References Cited

U.S. PATENT DOCUMENTS 4,789,962 A * 12/1988 Berry et al. ............... 715/715
5,621,904 A * 4/1997 Elliott et al. .............. 715/798
5,796,402 A * 8/1998 Ellison-Taylor ........... 715/792
5,880,733 A * 3/1999 Horvitz et al. ............. 715/850
6,008,809 A * 12/1999 Brooks ..................... 715/792
6,573,913 B1 * 6/2003 Butler et al. .............. 715/761
6,654,036 B1 * 11/2003 Jones ....................... 715/798
2004/0001041 A1 * 1/2004 Chang et al. .............. 345/156

OTHER PUBLICATIONS

"C4Q15 Quad™," *massmultiples.com*, Oct. 17, 2002, <http://www.massedi.com/mass_multiples/c4q15_quad.htm> [retrieved Jun. 19, 2003], 1 page.
"Get the Most Out of Multiple Monitors With UltraMon™," *realtimesoft.com*, May 13, 2003, <http://www.realtimesoft.com/ultramon/> [retrieved Jun. 19, 2003], 1 page.
"VideoSaver: The Multi-Monitor Video Screen Saver," *realtimesoft.com*, n.d., <http://www.realtimesoft.com/ultramon/overview> [retrieved Jun. 19, 2003], 2 pages.

(Continued)

*Primary Examiner*—Kee M. Tung
*Assistant Examiner*—Michelle K. Lay
(74) *Attorney, Agent, or Firm*—Christensen O'Connor Johnson Kindness PLLC

(57) ABSTRACT

A system and method for bumping graphical components between display regions of a graphical computer interface are provided. The present invention bumps a selected graphical component in response to a signal from an input device. Bumping involves locating a destination location for the graphical component to be bumped, and moving the graphical component to the destination. The destination can be determined in any one of a number of different manners. Destinations can be located at a predetermined distance from an original location of a graphical component, at an "analogous" location on another display region, or at an open location in the same display region or another display region.

27 Claims, 9 Drawing Sheets

OTHER PUBLICATIONS

Regan, T., et al, "Bumping Windows Between Monitors," Microsoft Research Technical Report MS-TR-2003-13, Mar. 1, 2003, 8 pages.

Baudisch, P., et al., "Focus Plus Context Screens: Combining Display Technology With Visualization Techniques," *Proceedings of the 14th Annual ACM Symposium on User Interface Software and Technology*, Orlando, Florida, Nov. 11-14, 2001.

Beaudouin-Lafon, M., "Novel Interaction Techniques for Overlapping Windows," *Proceedings of the 14th Annual ACM Symposium on User Interface Software and Technology*, Orlando, Florida, Nov. 11-14, 2001.

Bederson, B., et al., "Jazz: An Extensible Zoomable User Interface Graphics Toolkit in Java," *Proceedings of the 13th Annual ACM Symposium on User Interface Software and Technology*, San Diego, California, Nov. 5-8, 2000.

Bell, A.B., and S.K. Feiner, "Dynamic Space Management for User Interfaces," *Proceedings of the 13th Annual ACM Symposium on User Interface Software and Technology*, San Diego, California, Nov. 5-8, 2000, pp. 238-248.

Bly, S.A., and J.K. Rosenberg, "A Comparison of Tiled and Overlapping Windows," *Proceedings of the Conference on Human Factors in Computing Systems*, Boston, Apr. 13-17, 1986, pp. 101-106.

Fry, B., "Valence," *acg.media.mit.edu*, n.d., <http://acg.media.mit.edu/people/fry/valence/> [retrieved Jun. 19, 2003], 2 pages.

Furnas, G.W., "Generalized Fisheye Views," *Proceedings of the Conference on Human Factors in Computing Systems*, Boston, Apr. 13-17, 1986, pp. 16-23.

Grudin, J., "Partitioning Digital Worlds: Focal and Peripheral Awareness in Multiple Monitor Use," *Proceedings of the Conference on Human Factors in Computing Systems*, Seattle, Washington, Mar. 31-Apr. 5, 2001.

Guimbretière, F., et al., "Fluid Interaction With High-Resolution Wall-Size Displays," *Proceedings of the 14th Annual ACM Symposium on User Interface Software and Technology*, Orlando, Florida, Nov. 11-14, 2001, pp. 21-30.

Hutchings, D.R., and J. Stasko, "QuickSpace: New Operations for the Desktop Metaphor," *Proceedings of the Conference on Human Factors in Computing Systems*, Minneapolis, Minnesota, 2002.

Kandogan, E., and B. Shneiderman, "Elastic Windows: Improved Spatial Layout and Rapid Multiple Window Operations," *Proceedings of ACM Advanced Visual Interfaces*, Gubbio, Italy, May 27-29, 1996.

Myers, B.A., et al., "Interacting at a Distance: Measuring the Performance of Laser Pointers and Other Devices," *CHI Letters* 4(1):33-40, Apr. 2002.

North, C., and B. Shneiderman, "A Taxonomy of Multiple Window Coordinations," University of Maryland Science Dept. Technical Report #CS-TR-3854, College Park, Maryland, 1997.

Perlin, K., "Quikwriting: Continuous Stylus-Based Text Entry," *Proceedings of the 11th Annual Symposium on User Interface Software and Technology*, San Francisco, Nov. 1-4, 1998, pp. 215-216.

* cited by examiner

INTELLIGENT WINDOWS BUMPING METHOD AND SYSTEM

CROSS-REFERENCE TO RELATED APPLICATION

Pursuant to 35 U.S.C. § 119, this application claims the benefit of the filing date of Provisional Application No. 60/417,085, filed Oct. 8, 2002, entitled INTELLIGENT WINDOWS MOVEMENT AND RESIZE, the subject matter of which application is incorporated herein by reference.

FIELD OF THE INVENTION

The present invention relates in general to graphical component movement in computer user interfaces, and in particular, to a system and method of moving graphical components across graphical display regions or displays.

BACKGROUND OF THE INVENTION

In recent years, worldwide use of computers has increased dramatically. Computer application programs ("applications", "programs" or "apps") are used for a variety of purposes including word processing, accounting, database management, desktop publishing, communications, and the like. The efficiency of computer utilization is improved by allowing a user to easily access a variety of different programs directed to accomplishing tasks and fulfilling the various goals of the user. For example, an accountant might make regular and extensive use of a word processing program, an e-mail program, a spreadsheet program, and a personal information manager, each of which is represented as a program window on the computer display. Rather than having all these programs present on the same region of the display, the accountant may arrange the program windows around the display or across multiple displays. Repeatedly moving program windows across multiple monitors or across the display region of large displays may become tiresome due to the relatively large distances involved.

Some operating systems allow the user to customize program window display locations and to keep a program window at a particular location across multiple monitors. Such customization allows users to arrange their program windows, but does not help them with the dynamic arrangement of windows when various programs need to be switched around display regions. Display regions are the portion(s) of a computer display that contain program windows. Unfortunately, most users lack the patience or tools to efficiently arrange program windows using currently available options provided by operating systems. As a result, users tend to use program windows less efficiently; thereby making more commonly used programs more time consuming and difficult to access.

Therefore, a need exists for a new and improved method for assisting users in dynamically arranging graphical components, such as program windows, in a large graphical computer interface display environment in a way that improves accessibility.

SUMMARY OF THE INVENTION

A system and method for moving graphical components in a graphical computer interface are provided. Computing environments embodying the present invention include the ability to easily shift graphical components from one portion of a display to another location on the same or a different display.

In accordance with an aspect of the present invention, a method is provided that allows for moving a selected graphical component (window, graphical object, graphical image, or other graphical components) from its current location to the destination location in a single step. This process is being referred to as "bumping". The method may be implemented in a computer system including one display or multiple displays and at least one input device. The method determines when a graphical component is to be bumped, e.g., in response to a signal from an input device, which may occur when a graphical component is selected by the input device. The method locates a destination location for the graphical component to be bumped to, and bumps the graphical component to that destination location. Locating a destination location for a graphical component to be bumped to depends on the logic specified for determining a destination location.

In accordance with a further aspect of the present invention, destination locations are located at a predetermined distance from an original location of a graphical component. In accordance with an alternative aspect of the present invention, destination locations are located at an "analogous" location on another display region of a graphical computing interface. Analogous locations may be either at the same "pixel" coordinates on another display region or at proportionally the same distance from the edges of another display region.

In accordance with another aspect of the present invention, locating a destination further involves locating an open location for the graphical component. An open location in a graphical computing interface is any location with no other blocking graphical components. In accordance with some aspects of the present invention, even though an existing graphical component occupies a location within the graphical computing interface, some or all of the occupying graphical component may be considered nonblocking. The nonblocking portion would be an open location for a graphical component to be bumped to. Examples of possible nonblocking graphical components are white space portions (areas of an application not containing any content) and older graphical components that have not been accessed within a predetermined period of time.

In accordance with still further aspects of the present invention, the open location for the graphical component may be smaller than the graphical component in which case the graphical component is resized to fit within the open location.

As can be seen from the summary above, the present invention provides a method and system for efficiently moving graphical components around a graphical computing interface and providing a more manageable desktop environment for computer users and a related computer readable medium and system.

BRIEF DESCRIPTION OF THE DRAWINGS

Many of the advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
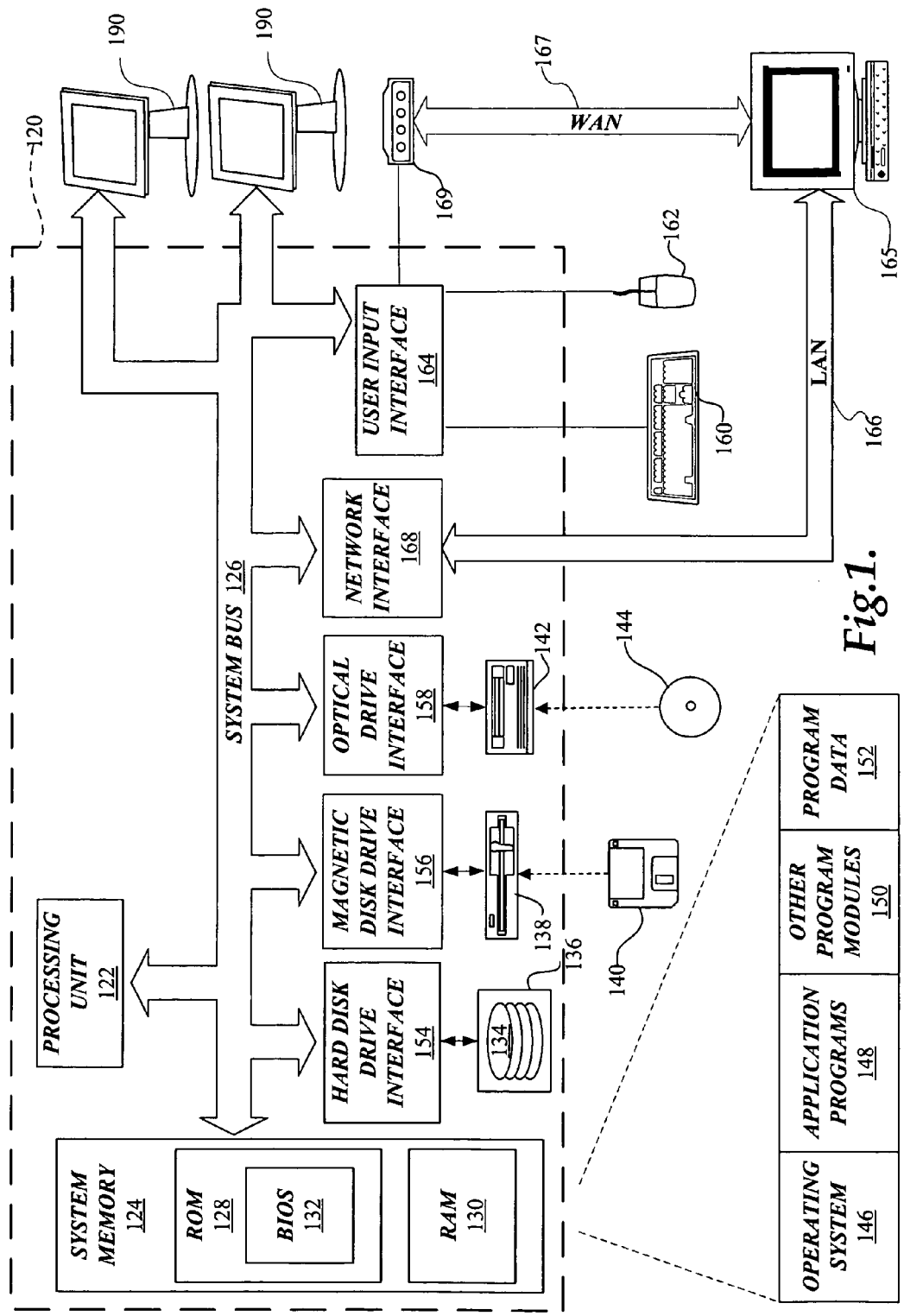
FIG. 1 is a block diagram of a personal computer that provides an exemplary operating environment for an embodiment of the present invention.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network. FIG. 1 illustrates an example of a suitable computing system environment in which the invention may be implemented. The computing system environment shown in FIG. 1 is only one example of a suitable computing environment and is not intended to suggest any limitation as to the scope of use or functionality of the invention. Neither should the computing environment be interpreted as having any dependency requirement relating to any one or a combination of components illustrated in the exemplary operating environment.

The invention is operational in numerous general purpose or special computing system environments or configurations. Examples of well known computing systems, environments, and/or configurations that may be suitable for implementing the invention, include, but are not limited to, personal computers, server computers, laptop devices, tablet computers, multiprocessor systems, microprocessor-based systems, network PCs, mini-computers, mainframe computers, and distributed computing environments that include any of the above systems, or the like.

The invention may be implemented as computer-executable instructions, such as program modules, suitable for execution by a computer. Generally, program modules include routines, programs, objects, components, data structures, etc. that perform a particular task or implement particular abstract data types. The invention may be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 120. Components of the computer 120 include, but are not limited to, a processing unit 122, a system memory 124, one or more displays 190, and a system bus 126 that couples various system components including the system memory 124 to the processor 122. The system bus 125 may be any of several types of bus structures including a memory bus or memory controller, peripheral bus, or a local bus using any of a variety of bus architectures. By way of example, and not limitation, such architectures include industry standard architecture ("ISA") bus, microchannel architecture ("MCA") bus, enhanced ISA ("EISA") bus, video electronic standards association ("VESA") local bus, peripheral component interconnect ("PCI") bus, also known as mezzanine bus, and accelerated graphics port ("AGP") bus.

The computer 120 typically includes a variety of computer-readable media. Computer-readable media can be any available media that can be accessed by the computer 120 and include both volatile and non-volatile media, and removable and non-removable media.

By way of example, and not limitation, computer-readable media may comprise computer storage media and communication media. Computer storage media includes, but is not limited to, RAM, ROM, EEPROM, flash memory or other memory technology, CD-ROM, digital versatile disc ("DVD") or other optical storage, magnetic cassettes, magnetic tape, magnetic disk storage or other magnetic storage devices, or any other medium which can be used to store or communicate the desired information and which can be accessed by the computer 120.

The communication media typically embodies computer-readable instructions, data structures, program modules, or other data in a modulated data signal, such as a carrier wave or other typical transport mechanism, and includes any information delivery media. The term "modulated data signal" means a signal that has one or more of its characteristics set or changed in such a manner to encode information in the signal. By way of example, and not limitation, communication media includes wired media, such as a wired network or direct wired connection, and wireless media, such as acoustic, radio frequency, infrared, and other wireless media. Combinations of any of the above should also be included within the scope of computer-readable media.

The system memory 124 includes computer storage media in the form of volatile and non-volatile memory, such as read only memory ("ROM") 128 and random access memory ("RAM") 130. A basic input/output system 132 ("BIOS") containing basic routines that help to transfer information between elements within the computer 120, such as during startup, is typically stored in ROM 128. RAM 130 typically contains data and/or program modules that are immediately accessible to, and/or presently being operated on, by the processing unit 122. By way of example, and not limitation, FIG. 1 illustrates an operating system 146, application programs 148, other program modules 150, and program data 152.

The computer 120 may also include removable/non-removable, volatile/non-volatile computer storage media. By way of example only, FIG. 1 illustrates a hard disk drive 134 that reads from or writes to non-removable, non-volatile magnetic media 136, a magnetic drive 138 that reads from or writes to a removable, non-volatile magnetic disk 140, and an optical drive 142 that reads from or writes to a removable, non-volatile optical disc 144, such as a CD-ROM or other optical media. Other removable/non-removable, volatile/non-volatile computer storage media that can be used in the exemplary operating environment include, but are not limited to, magnetic tape cassettes, flash memory cards, DVDs, digital video tapes, Bernoulli cap cartridges, solid state RAM, solid state ROM, and the like. The hard disk drive 134, magnetic disk drive 138, and optical disc drive 142 may be connected to the system bus 126 by a hard disk drive interface 154, a magnetic disk drive interface 156, and an optical drive interface 158, respectively. Alternatively, hard disk drive 134, magnetic disk drive 138, and optical disc drive 142 may be connected to the system bus 126 by a small computer system interface ("SCSI").

The drives and their associated computer storage media discussed above and illustrated in FIG. 1, provide storage of computer-readable instructions, data structures, program modules, and other data from the computer 120. In FIG. 1, for example, the hard disk drive 134 may also store the operating system 146, application programs 148, other programs 150 and program data 152. Note that these components can either be the same as or different from the operating system 146, the other program modules 150, and the program data 152. A user may enter commands and information into the computer 120 through an input device, such as keyboard 160 and/or a pointing device 162, commonly referred to as a mouse, trackball, or touch pad. Other input devices (not shown) may include a microphone, a joystick, a game pad, a satellite dish, a scanner, or the like. These and other input devices are often connected to the system bus 126 through user input interface 164 and may be connected by other interface and bus structures, such as a parallel port, serial port, game port, universal serial bus ("USB"), or other interface.

The computer 120 may operate in a network environment using logical connections to one or more remote computers 165. The remote computer 165 may be a personal computer, a server, a router, a network PC, a peer device, or other common network node and typically includes many or all the elements described above relative to the computer 120. The logical connections depicted in FIG. 1 include a local area network ("LAN") 166 and a wide area network ("WAN") 167, but may also include other networks. Such network environments are commonplace in offices, enterprise-wide computer networks, intranets, and the Internet.

When used in a LAN network environment, the computer 120 is connected to the LAN 166 through a network interface 168. When using a WAN network environment, the computer typically includes a modem or other means for establishing communication over the WAN, including a network interface 168, over the WAN 167, such as the Internet. The modem 169, which may be internal or external, may be connected to the system bus 126 via the user input interface 164 or other appropriate mechanism. It will be appreciated that the network connections shown are exemplary and that other means of establishing communications between computers may be used. Although many other internal components of the computer 120 are not shown, those of ordinary skill in the art will appreciate that such components and their interconnections are well known. Accordingly, additional details concerning the internal construction of the computer 120 need not be disclosed in connection with the present invention.

Those skilled in the art will understand that program modules, such as the operating system 146, the application programs 148, and the data 152 are provided to the computer 120 via one of its memory storage devices, which may include ROM 128, RAM 130, hard disk 134, magnetic disk drive 138, or optical disc drive 142. The hard disk drive 134 is used to store data 152 and programs, including the operating system 146 and application programs 148.

When the computer 120 is turned on or reset, the BIOS 132, which is stored in ROM, instructs the processing unit 122 to load the operating system 146 from the hard disk drive 134 into the RAM 130. Once the operating system 146 is located into RAM 130, the processing unit 122 executes the operating system code and causes the visual elements associated with the user interface of the operating system to be displayed on a monitor. When a program 148 is opened by a user, the program code and relevant data are read from the hard disk drive 134 and stored in RAM 130.

The present invention provides, a system, method, and computer readable medium for bumping program windows within a graphical user interface ("GUI") based upon predetermined criteria. Bumping comprises moving a program window from one location in a graphical user interface to another location in a predictable manner. In some exemplary embodiments or the present invention, the movement of a program window from an original location to a destination location is accompanied by an animated series of graphical images showing the movement of the window to the destination location. In other exemplary embodiments of the present invention, bumping of windows occurs with no accompanying animation.

A simple example of bumping in a two-monitor computing system is bumping a program window from the display on one monitor to the display on the other monitor. Such abilities already exist in some application programs. However, often the other monitor (display region) already has one or more open windows. This can create location problems for the bumped program window that are resolved by the present invention. In one embodiment of the present invention, open windows are located, and the bumped program window is moved to a portion of the GUI with no open windows. In another embodiment of the present invention, if no open space within which the bumped window will fit is available, the bumped window is shrunk to fit the largest open space. The concepts of open space and blocked or closed space in a GUI can be used to create an extensible system of bumping windows, such that program windows may be bumped in a number of different predetermined manners.

FIGS. 2–5 are flow diagrams that illustrate routines and subroutines of embodiments of the present invention, wherein windows are bumped from one display location to another display location in a predetermined manner.

Figure 2:
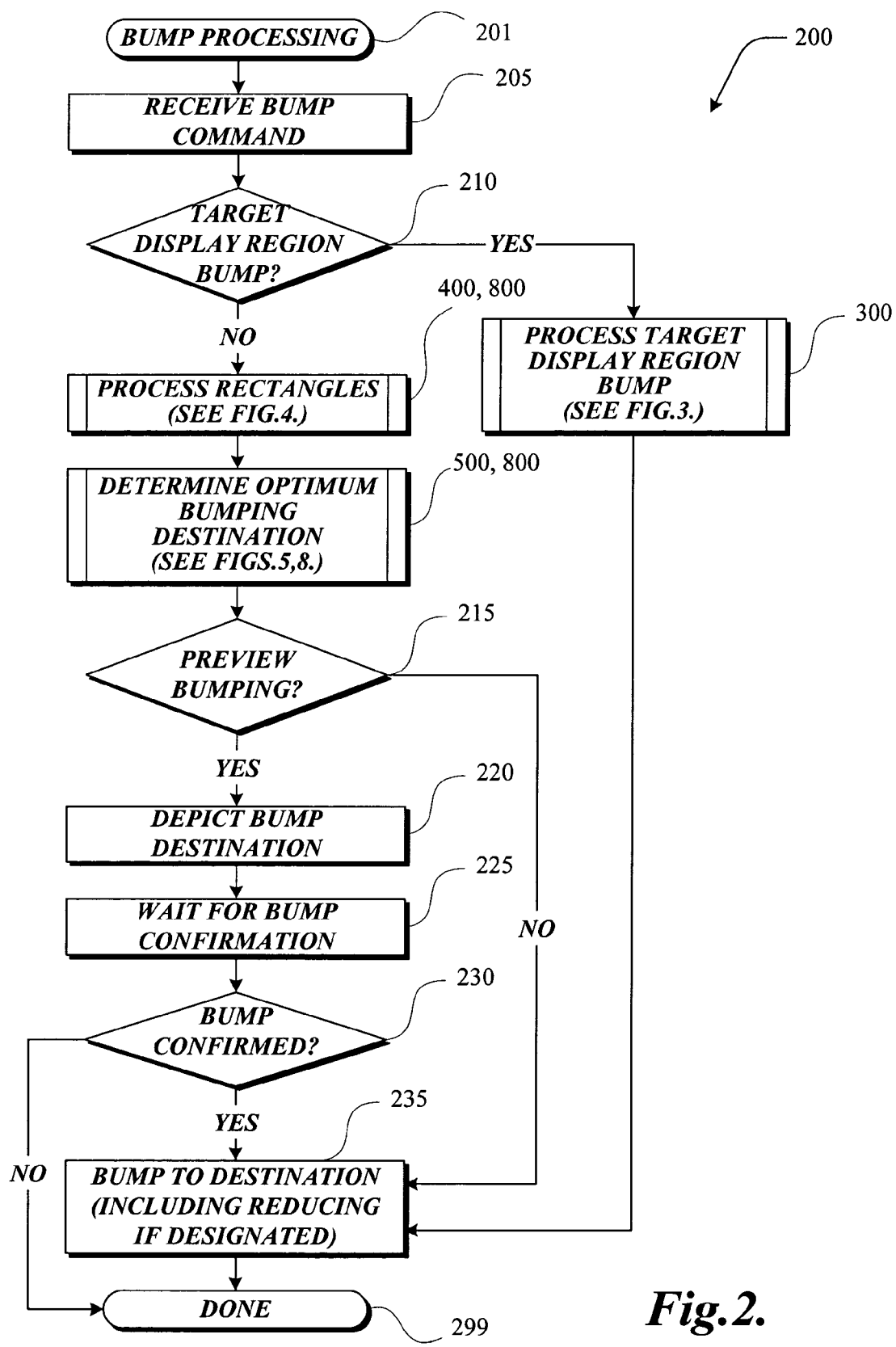
FIG. 2 is a flow diagram illustrating a routine for window bump processing in accordance with the present invention.

FIG. 2 illustrates a routine 200 for processing bump requests in accordance with one aspect of the present invention. Routine 200 begins at blocks 201 and proceeds to block 205 where a bump command is received for a currently selected window. A bump command may be generated when a user clicks on a button, sends a keystroke command, performs a mouse movement, or in some other way indicates that a window should be bumped to another location, for example. One illustrative example is shown as a graphical directional button 610 in FIG. 6 and described below. Other embodiments include using mouse navigation buttons, trackballs, gestures sensed by a motion detector (e.g., hand, finger, wand or facial gestures) or other input methods to bump windows across display regions.

Next, in determination block 210, a test is made whether configuration settings or a user command has designated a "target display region" bump. A target display region bump is one that switches a program window from one display region to another display region without any processing to determine where in the other display region the window would fit. If it is determined in decision block 210 that a target display region bump is desired, processing proceeds to subroutine block 300, illustrated in FIG. 3 and described below. After subroutine 300 returns, processing continues to block 235 where the window is bumped to its destination display region, and may be reduced in size if a reduction in size was designated (or the open space at the destination is too small for the window). Processing then ends at block 299.

Figure 4:
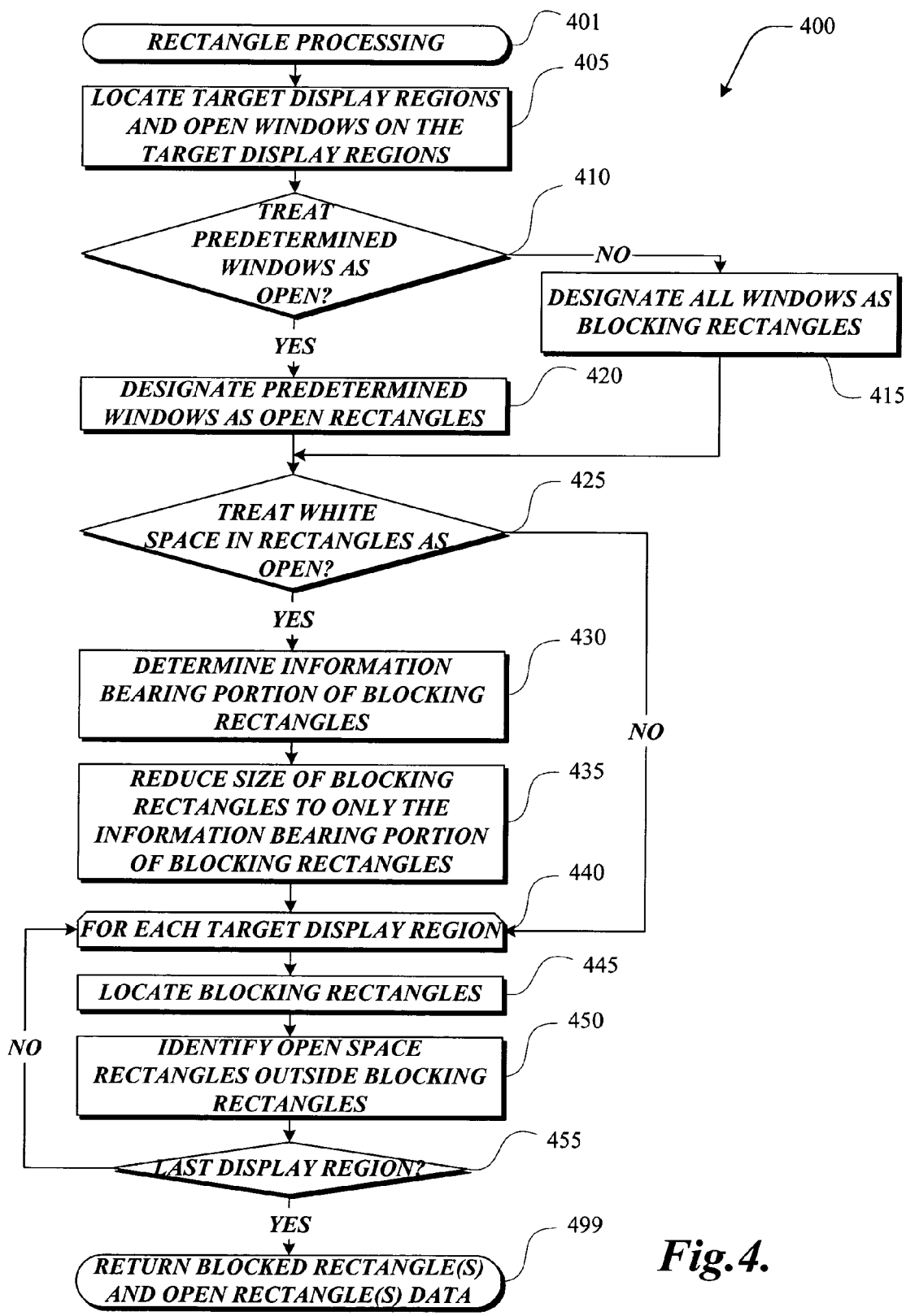
FIG. 4 is a flow diagram illustrating a rectangle processing subroutine suitable for use in the routine illustrated in FIG. 2.

If, however, in decision block 210 it was determined that a target display region bump was not desired, processing proceeds to subroutine block 400 where rectangles are processed for future determination of where or if a window should be bumped. Subroutine 400 is illustrated in FIG. 4, which is described below. Briefly, rectangle processing subroutine 400 examines display regions and windows to locate potential spaces to which a window may be bumped.

Figure 5:
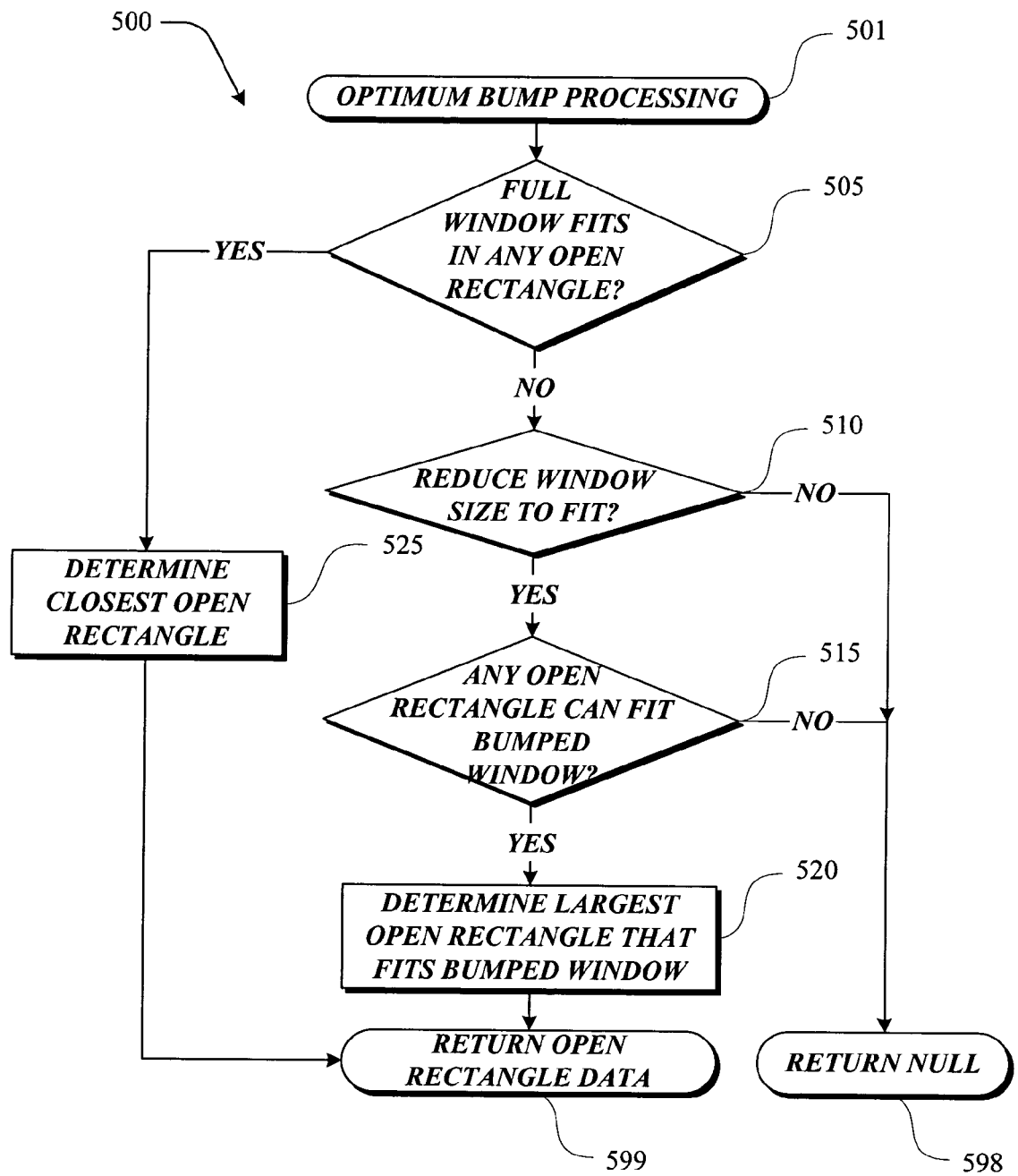
FIG. 5 is a flow diagram illustrating an optimum bump processing subroutine suitable for use in the routine illustrated in FIG. 2.

After subroutine 400 returns, processing to subroutine block 500 where the optimum bumping destination is determined. Subroutine 500 is illustrated in FIG. 5 and described in detail below. In general, subroutine 500 determines which, if any, of the spaces located in subroutine 400 is an optimum bump location.

Figure 8A:
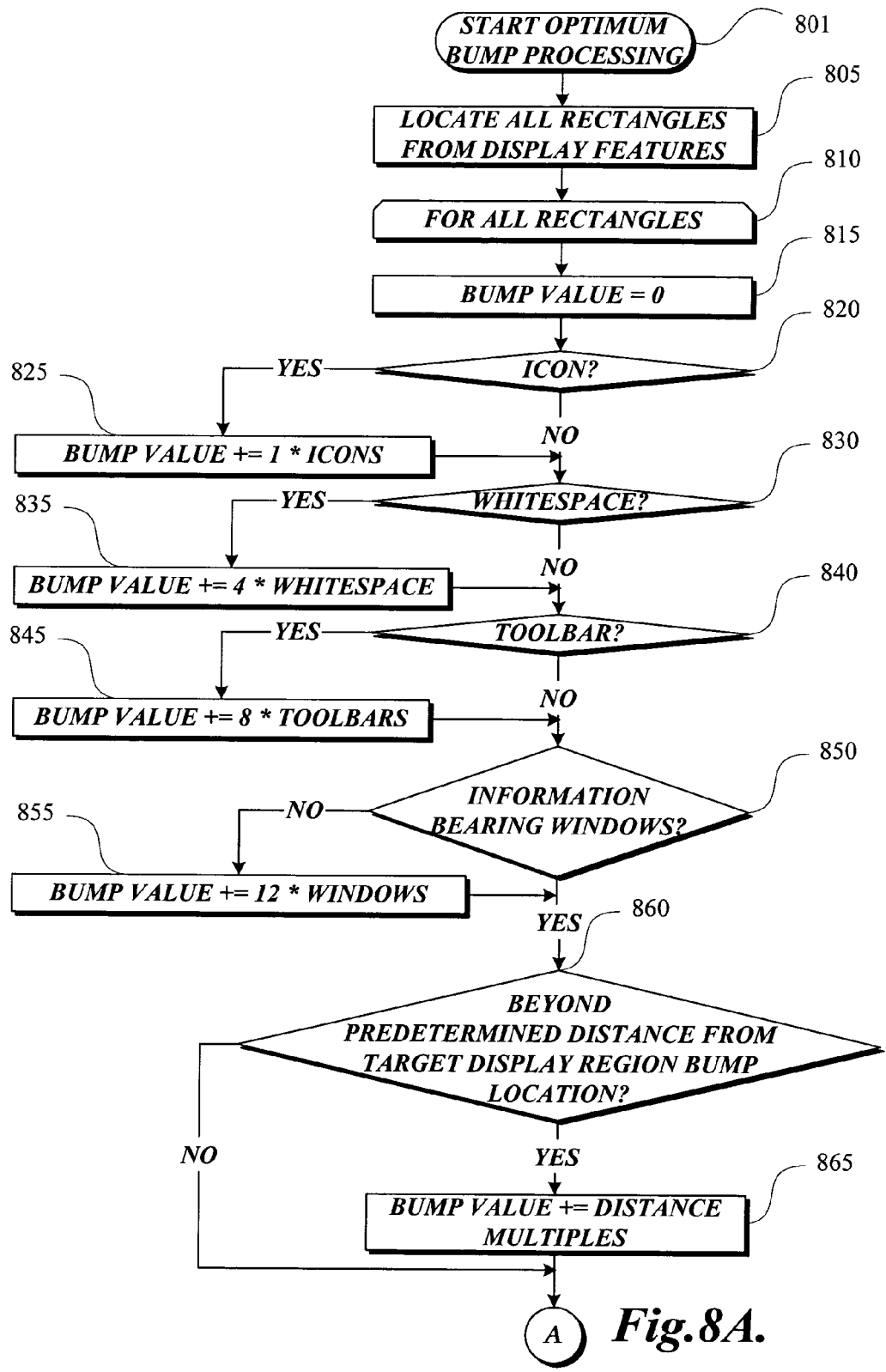
FIGS. 8A–B illustrate a flow diagram for an optimum bump processing subroutine suitable for use in the routine illustrated in FIG. 2.
Figure 8B:
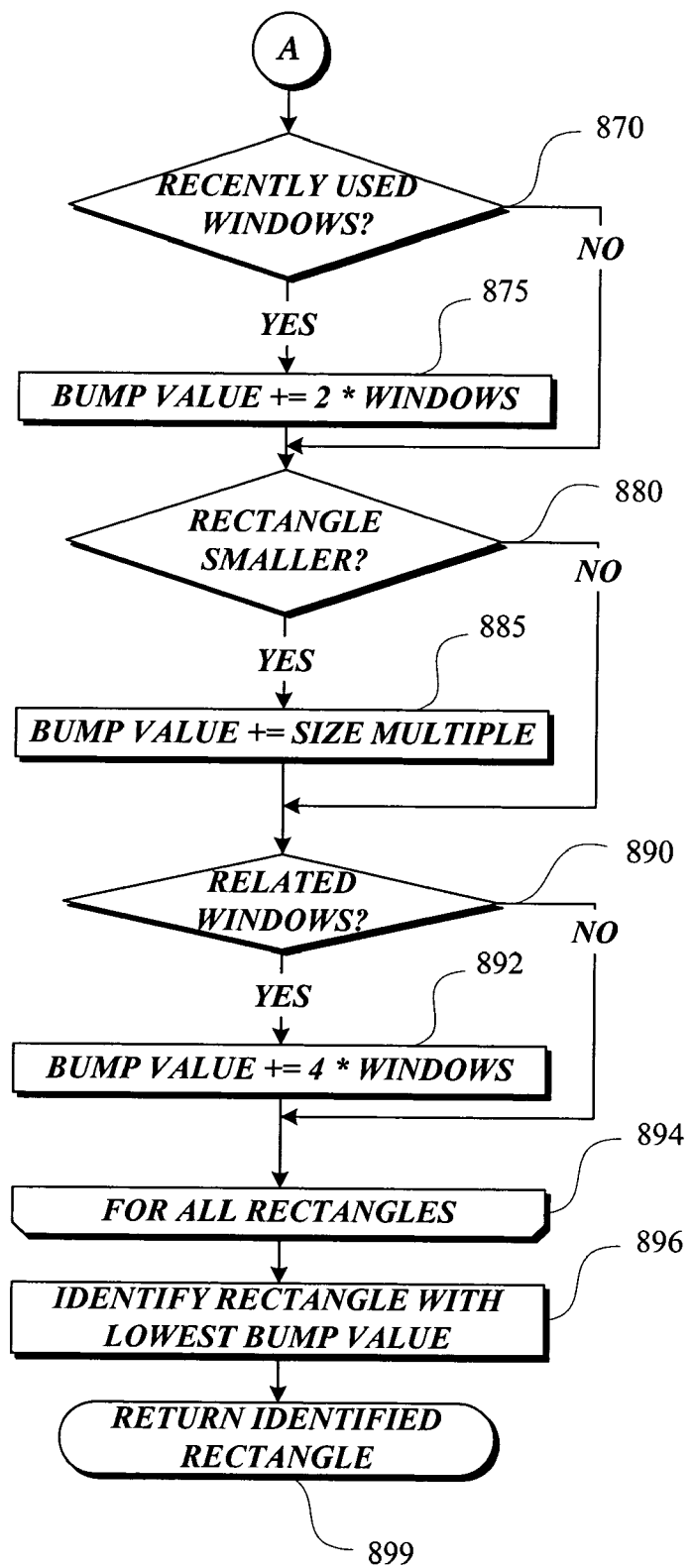

In an alternate embodiment of the present invention, the bump processing routine 200 may use alternate optimum bump processing subroutine 800 instead of rectangle processing subroutines 400 and optimum bump processing subroutine 500 to locate possible rectangle locations for a bumped window and to determine an optimal bump location. Optimum bump processing subroutine 800 is illustrated in FIG. 8 and described below.

Processing continues to decision block 215 where a determination is made whether configuration settings or user commands have designated preview bumping. Previewing bumping is a process of indicating where a window would be bumped to, without actually moving the window to its new destination. Accordingly, if in decision block 215 it was determined that bumping should be previewed, processing continues to block 220 where the bump destination is depicted. In one exemplary embodiment, the bump destination is depicted as rectangular placeholder image that is shown in the bump destination. Routine 200 then waits for a confirmation of the bump at the indicated destination. In decision block 230, if it was found that the bump was not confirmed, routine 200 ends at block 299 without a bump. If, however, in decision block 230 it was found that the bump was confirmed, or if back in decision block 215 if it was determined not to preview bumping, in both cases, processing proceeds to block 235 where the window is bumped to its destination (including reducing the size of the window if so designated). Subroutine 200 then ends at block 299.

Those of ordinary skill in the art will appreciate that routine 200 is merely an illustrative example of certain aspects of the present invention and is not intended to limit the scope of the present invention. Many pieces of information may be included in the bump command received in block 205 that are not described in detail here, for example, a particular monitor and/or display region location may be included in the bump command to preempt other processing.

Figure 3:
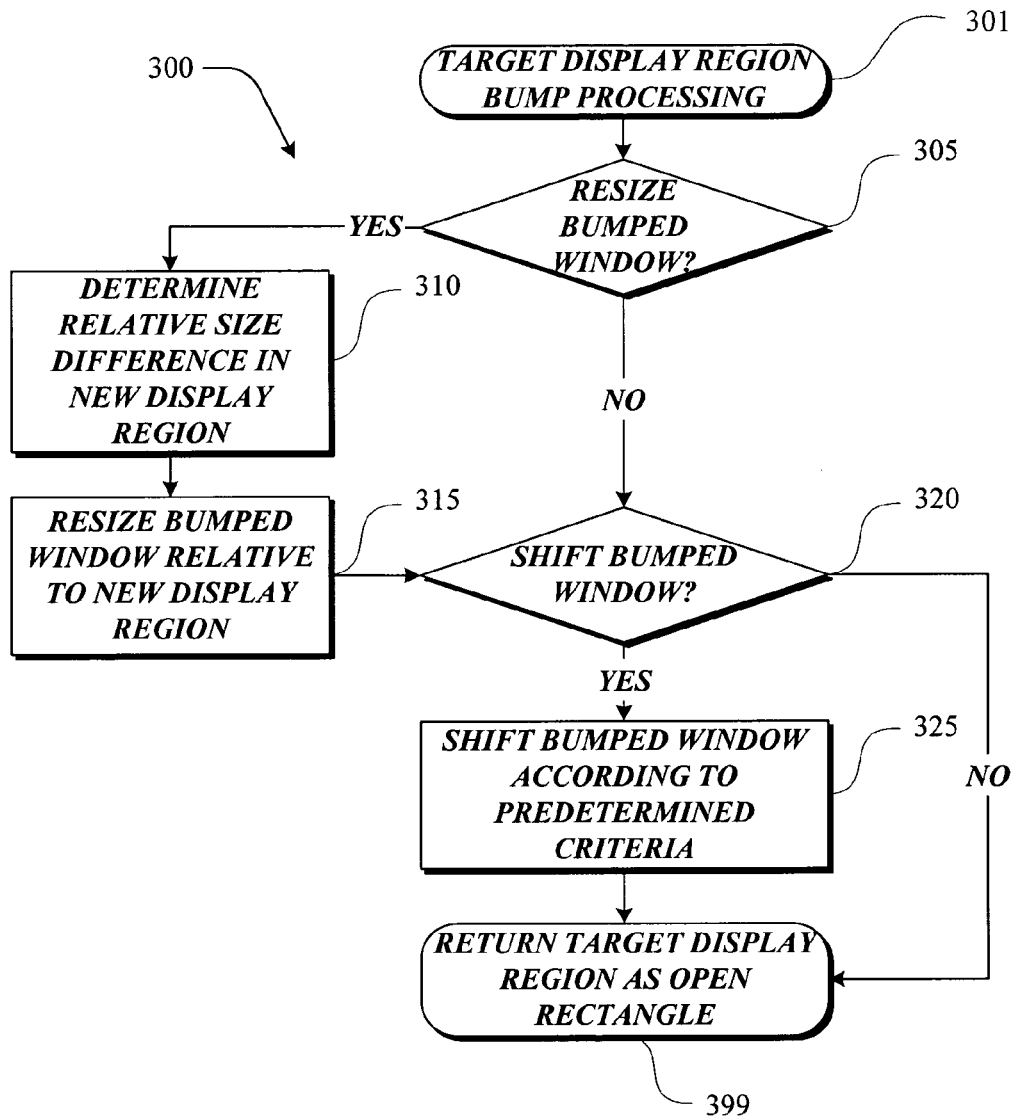
FIG. 3 is a flow diagram illustrating a target display region processing subroutine suitable for use in the routine illustrated in FIG. 2.

FIG. 3 illustrates a target display region bump processing subroutine 300, for processing target display region bumps. Subroutine 300 begins at block 301 and proceeds to decision block 305 where a determination is made whether configuration settings or a user command has designated that a bumped window should be resized. If in decision block 305 it is determined that a bumped window should be resized, then processing continues to block 310 where the relative size difference of the new target display region is determined in relation to the old display region, i.e., the display region from which the window is being bumped. Next, in block 315, the bumped window is resized relative to the new display region such that it maintains its size in the new display region. For example, assume an old display region was a 1,000×700 pixel display region and the target window is 400×400 pixels. If the target display region is a 500×350 pixel display region, the relative size difference between the two display regions is one-half in each dimension. Accordingly, the new size of the bumped window would be 200×200 pixels.

Next, or if in decision block 305 it was determined that the bumped window should not be resized, processing proceeds to decision block 320 where a determination is made whether the bumped window should be shifted into another position on the target display region. Absent a shift, a window will be placed at a logically identical location on the target display region. There may be any number of reasons for shifting the bumped window. For example, if the bump command indicates a direction in which the bumped window is to be shifted, the window will be shifted in the indicated direction. Alternatively, a window may be shifted so that at least one edge of the window will always remain visible in the target display region. This is useful when a window that is larger in size than the size of the target display region is bumped to the target display region without being resized. If all of the edges of the window fall outside the edges of the target display region, a user may have difficulty when trying to control the window. Those of ordinary skill in the art, and others, will appreciate that there may be still further reasons for shifting a bumped window within a target display region, some of which may be automatically based on some predetermined criteria and others of which may require user input.

If in decision block 320 it is determined that the bumped window should be shifted, processing proceeds to block 325 where the bumped window is shifted according to the predetermined criteria (or user input). Illustrative predetermined criteria other than shifting a window so at least one of its edges are available, include shifting a window so that the upper left-hand corner is available, shifting a window so that the window is aligned with other windows in the target display region and/or shifting a window such that the window snaps to an available rectangle in the target display region. One skilled in the relevant art will appreciate that alternative or additional criteria may be used. After the bumped window has been shifted or if in decision block 320 it was determined that the bumped window should not be shifted, routine 300 proceeds to block 399 where the target display region is returned as an open rectangle to which a program window may be bumped.

FIG. 4 illustrates a rectangle processing routine. The rectangular processing routine determines where rectangular objects (e.g., windows, display regions, task bars, control bars and other rectangular graphical components—even those with transparent regions) are located and processes the object location information to provide information that can be used to determine where bumped windows can be located. Open spaces on display regions generally include at least those parts of the display regions with no other windows. Closed spaces are those that contain objects that should not be covered by a bumped window. As described below, embodiments of the present invention treat different display elements as either open or closed.

Subroutine 400 begins at block 401 and proceeds to block 405 where target display regions and open windows on the target display regions are located. Open windows include task bars and control bars. Next, in decision block 410 a determination is made whether to treat certain predetermined windows as open space. Treating certain windows as open space might occur in embodiments of the invention that place less importance on previously obscured windows and/or windows that relate to applications that have not been used for long periods of time. Still other types of predetermined windows might be windows that are unrelated to a particular group of windows. In other illustrative embodiments of the present invention, predetermined windows may be windows all relating to the same project, windows all relating to the same application, or windows all relating to the same group of applications.

If in decision block 410 it was determined that certain windows should be treated as open, processing proceeds to block 420 where the predetermined windows are designated as open space and are not considered blocking for purposes of bumping a window onto the display region covered by the predetermined windows. Processing then continues to decision block 425. If, however, in decision block 410 it was determined that predetermined windows should not be treated as open space, processing proceeds to block 415 where all of the windows are designated as blocking rectangles in the target display region. Then processing proceeds to decision block 425.

At decision block 425, a determination is made from user commands or configuration settings whether to treat white space in blocking rectangles as additional open space. White space is generally the portion of a program window with no information-bearing content.

If white space is to be treated as open space, processing continues to block 430 where the information-bearing portions of any blocking rectangles are determined. Next, in block 435 the size of the blocking rectangles is reduced to cover only the information-bearing portions of the blocking rectangles. Reducing the size of blocking rectangles simply redefines the area and coordinates of an existing window so the area and coordinates within the window with information bearing part(s) of the window are not "open" for bumping. While the information-bearing portion of a blocking rectangle may vary from window to window, some illustrative examples of information-bearing portions of a program window are a portion of a word processing program window that contains text, the data filled spreadsheet portion of a spreadsheet program window, and the edited pixels in a graphical editing program window. These application programs are included as illustrative examples of applications programs that may contain information-bearing and white space regions and are not meant to be limiting with regard to the present invention. After block 435 or if in decision block 425 it was determined that white space in blocking rectangles should not be treated as open space, processing continues to looping block 440.

Looping block 440 iterates through each target display region with the following actions. In block 445, all blocking rectangles are located. As noted above, the definition of a blocking rectangle will depend on whether certain predetermined windows should be considered as open space and whether white space in what would otherwise be blocking rectangles should also be treated as open space. After the blocking rectangles have been determined for a display region in block 445, then in block 450 open space rectangles that are located outside of the blocking rectangles are identified. For example, if a square display region has only a single blocking rectangle located in the lower left-hand quadrant that takes up one quarter of the display region, it would be possible to identify at least two open space rectangles located outside the blocking rectangle, namely, a vertically oriented rectangle located across the right half of the display region and a horizontally oriented rectangle located across the upper half of the display region. Next, in decision block 455 a determination is made whether this is the last display region for rectangle processing. If this is not the last display region, processing loops back to block 440 for another iteration. If, however, in decision block 455 it was determined that this is the last display region, processing proceeds to block 499 where subroutine 400 returns the blocked and open rectangle data to the calling routine.

FIG. 5 illustrates an exemplary optimum bump processing subroutine 500 for selecting an open rectangle to which a program window can be bumped. Subroutine 500 begins at block 501 and proceeds to decision block 505 where a determination is made whether the full window to be bumped fits in any open space rectangle of any target display region. If so, processing continues to block 525 where the closest open rectangle in which the full window to be bumped will fit is determined. After the open rectangle has been determined in block 525, processing continues to block 599 where the data on the open rectangle is returned to the calling routine.

Those of ordinary skill in the art will appreciate that in some instances an open rectangle other than the closest rectangle may be desired and/or indicated by a user bumping a window. Accordingly, the user may issue multiple bump commands to reach the desired location. In an alternate embodiment of the present invention, instead of subroutine 500 returning a single optimum destination, subroutine 500, may return a ranked listing of bumping destinations each of which may be iterated through to determine from a user's perspective an optimum bumping destination. Still further in such a ranked optimum destination embodiment, user specific "optimum destinations" may be determined, i.e., the optimum bumping destination subroutine 500 may include code that learns a user's preferences with regard to where to bump windows.

Returning to decision block 505, if it was determined that the full window will not fit into any open space rectangle, processing proceeds to decision block 510 where a determination is made whether it is possible to reduce the window size. If it is not possible to reduce the window size, processing proceeds to block 598 where a null value is returned indicating that it is not possible to bump the window as there is no open rectangle large enough to receive the window. If, however, in decision block 510 it was determined that the window size may be reduced, processing continues to decision block 515 where a determination is made whether a reduced sized bumped window will fit in any available open rectangle. If a reduced size bumped window will not fit in any available open rectangle, processing proceeds to block 598 where a null response is returned. If in decision block 515 it was found that an open rectangle, into which the bumped window can made to fit is available, processing proceeds to block 520 where the largest open rectangle into which the bumped window will fit is determined. The information on the largest open rectangle is then returned to the calling routine in block 599.

Figure 6:
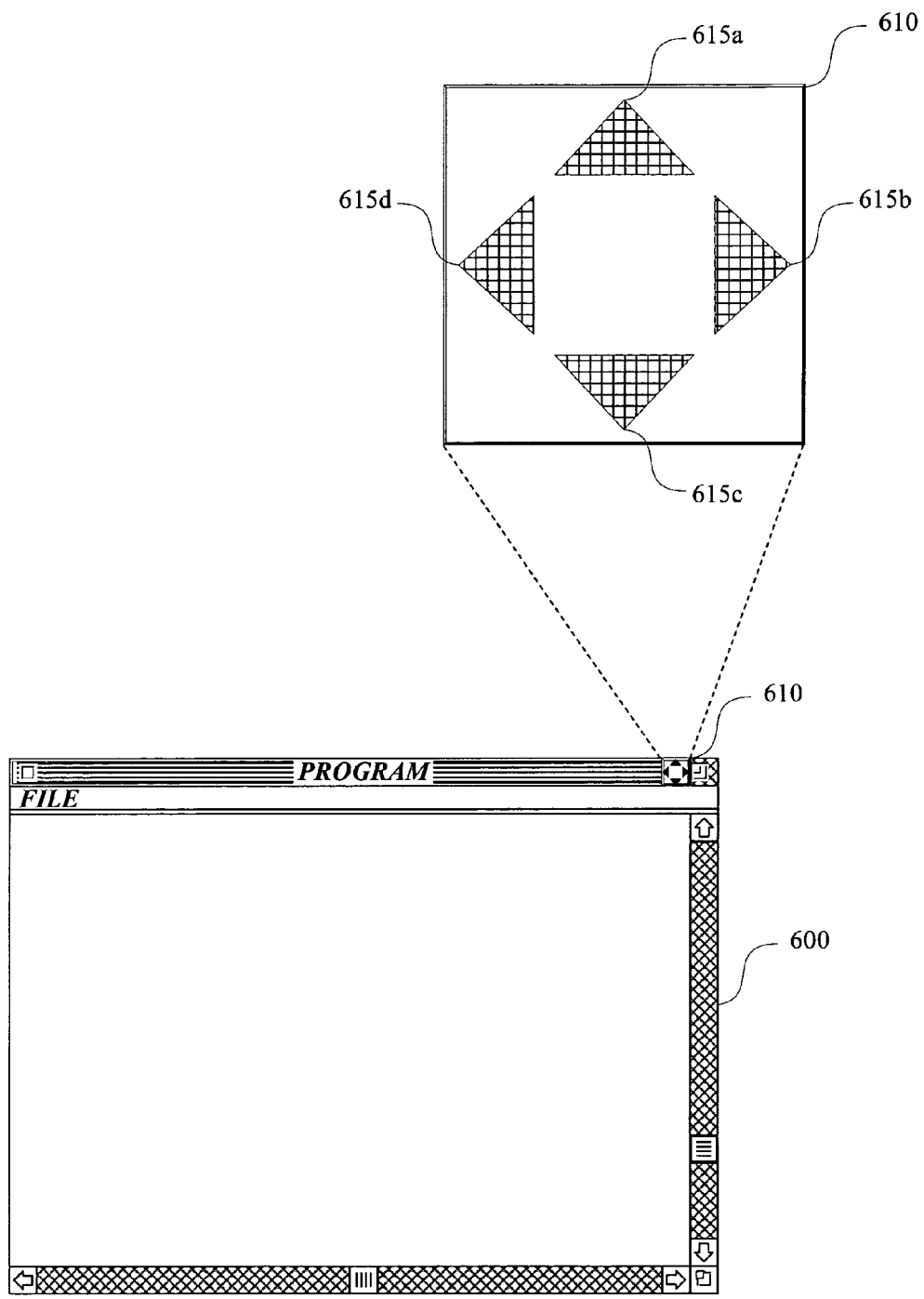
FIG. 6 is an exemplary screen shot of a program window having a bump button user interface formed in accordance with the present invention.

FIG. 6 illustrates one of many possible exemplary additions to a graphical user interface for use in implementing bumping in accordance with certain aspects of the present invention. The addition is a directional bump button 610 that is displayed with a program window 600. This directional bumping button includes directional arrows 615A–D for bumping windows in an indicated direction. Those of ordinary skill in the art and others will appreciate that by selecting one of the directional bumping arrows 615A, 615B, 615C, or 615D, it is possible to bump a program window 600 in a predetermined direction as described more fully above. Those of ordinary skill in the art and others will appreciate that the exemplary additions to a graphical user interface may also include other variations, including, but not limited to, different button shapes and/or positions or dynamic buttons that change appearance dynamically based on a window's status (e.g., position, whether overlapped, whether active, etc.).

Figure 7:
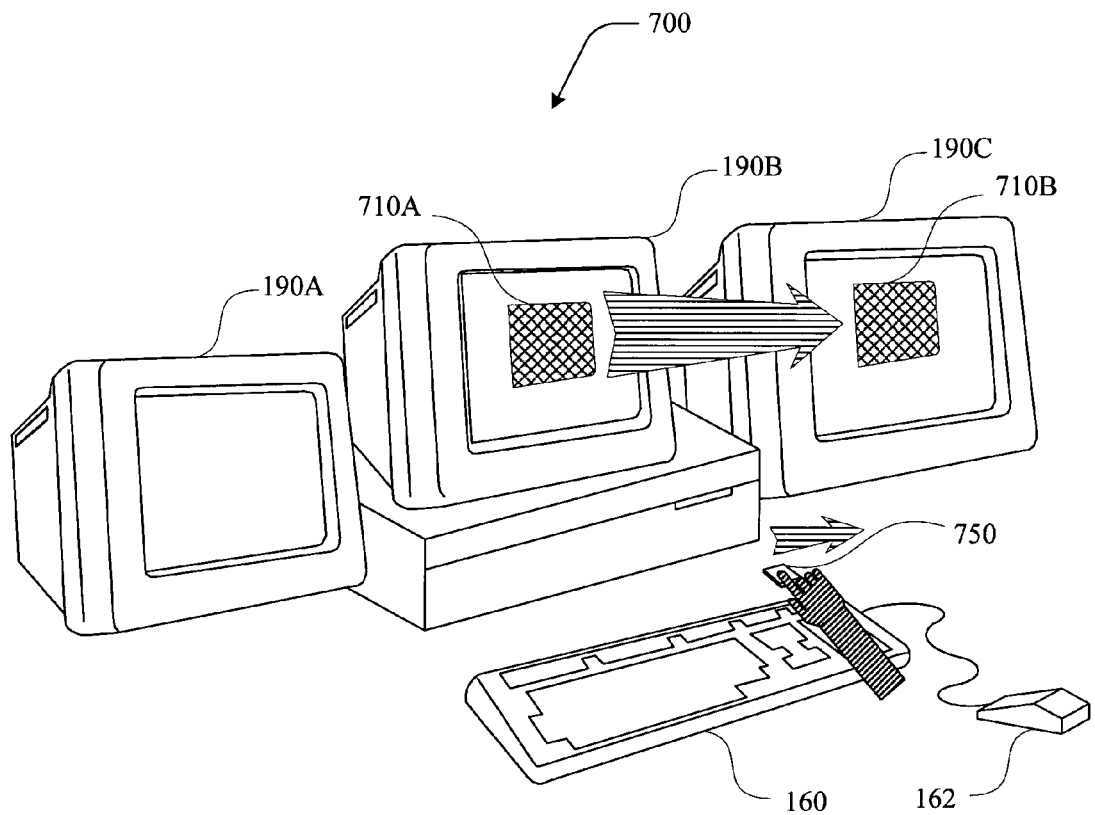
FIG. 7 is an exemplary computing apparatus having multiple displays and a physical bumping interface formed in accordance with the present invention.

FIG. 7 illustrates an exemplary computing system 700 having multiple displays 190A–C. Also included in the exemplary computing system 700 are a number of input devices, namely, a keyboard 160, a mouse 162, and an alternate input device 750 (e.g., a motion detector, trackball, external keypad, etc.). FIG. 7 also shows a window at a first location 710A on one display 190B being bumped to a second location 710B on a second display 190C. Those of ordinary skill in the art and others will appreciate that a user's instruction to bump the window from the first location 710A to the second location 710B could have been received from a menu or keystroke command initiated by any of the input devices shown in the exemplary computing system 700. In one exemplary embodiment of the present invention, the alternate input device 750 is at least partially dedicated to generating bumping commands (and directions). Those of ordinary skill in the art and others will appreciate that the exemplary computing system 700 shown in FIG. 7 is merely one example of a computing environment suitable for practicing the present invention, and that other environments are also suitable. For example, more or less displays may be used in alternate computing environment, and the displays may be in alternate orientations relative to each other.

FIG. 8 illustrates an alternative exemplary optimum bump processing subroutine 800 that locates a destination location for a bumped graphical component. Optimum bump processing subroutine 800 begins at block 801 and proceeds to block 805 where all rectangles defined by graphical components in the display region(s) of the display(s) 190 are located. In one exemplary embodiment of the present invention, the edges of all graphical components are used in locating rectangles where a graphical component may be bumped to. Next, looping block 810 begins an iteration through each located rectangle. The first in the loop is block 815 where the rectangle's initial bump value is assigned as "0." Next, in decision block 820, a determination is made whether the current rectangle covers one or more "icon" graphical components; if so, then in block 825 the current rectangle's bump value is incremented by "1" for each icon covered by the current rectangle. If, however, in decision block 820, it was determined that the current rectangle does not cover any icons, then processing proceeds to decision block 830 where a determination is made whether the current rectangle covers any white space components. If in decision block 830 it was determined that the current rectangle does cover one or more white space components, then processing proceeds to block 835 where the current rectangle's bump value is incremented by "4" for each white space component covered by the current rectangle, then processing proceeds to decision block 840. If, however, in decision block 830, it was determined that the current rectangle does not cover any white space components, then processing proceeds directly to decision block 840 where a determination is made whether the current rectangle covers a toolbar. If the current rectangle covers one or more toolbars then its bump value is incremented by "8" for each toolbar the current rectangle covers (block 845), and processing proceeds to decision block 850. If, however, in decision block 840 it was determined that the current rectangle does not cover a toolbar, then processing proceeds directly to decision block 850 where a determination is made whether the current rectangle covers an information bearing window (e.g., non-white space). If the current rectangle being iterated through covers one or more an information bearing windows, then in block 855, the current rectangle's bump value incremented by "12" for each information bearing window covered by the current rectangle, and processing proceeds to decision block 860. If, however, in decision block 850 it was determined that the current rectangle does not cover any information bearing windows, then processing proceeds to decision block 860 where a determination is made whether the current rectangle is beyond a predetermined distance from a target display region bump location, i.e. a location that the graphical component would have been bumped to in target display region bump subroutine 300. If so, then in block 865, the current rectangle's bump value is increased by "1" for each multiple of the predetermined distance that the current rectangle is from the target display region bump location. Processing proceeds to decision block 870. If, however, in decision block 860 a determination was made that the current rectangle is not beyond a predetermined distance from a target display region bump location, then processing proceeds directly to decision block 870. In decision block 870, a determination is made whether the current rectangle covers any windows that have been recently used (e.g., within a predetermined period of time). If the current rectangle covers any window that has been used recently, then the current rectangle's bump value is increase by "2" for each window that has been used recently in block 875 and processing proceeds to decision block 880. If, however, in decision block 870 it was determined that the current rectangle does not cover any window that has been recently used, then processing proceeds directly to decision block 880. In decision block 880, a determination is made whether the current rectangle is smaller than the graphical component to be bumped. If in decision block 880 it was determined that the current rectangle is smaller than the graphical component, then in block 885 the bump value of the current rectangle is increased by "1" for each multiple of a predetermined percent reduced size difference from the graphical component to be bumped, and processing proceeds to decision block 890. For example, if for every five percent reduction in size a point is added to the bump value of the current rectangle, then a current rectangle that was fifty percent smaller in total area than the graphical component to be bumped would have an increase to its bump value of "10."

If, however, in decision block 880 it was determined that the current rectangle is not smaller than the graphical component to be bumped, then processing proceeds directly to decision block 890. In decision block 890, a determination is made whether the current rectangle covers any window related in some predetermined fashion to the graphical component to be bumped. If so, then processing proceeds to block 892 where the bump value of the current rectangle is increased by "4" (block 892) for each window related to the graphical component to be bumped that is covered by the current rectangle, and processing proceeds to looping block 894. If, however, in decision block 890 a determination is made that the current rectangle does not cover any window related to the graphical component to be bumped, then processing proceeds directly to looping block 894. In looping block 894, optimum bump processing subroutine 800 cycles back to looping block 810 until all rectangles have been iterated through. Once all rectangles have been iterated through, then processing proceeds to block 896 where the rectangle with the lowest bump value is identified. Next, in block 899, optimum bump processing subroutine 800 ends and returns the identified rectangle with the lowest bump value back to its calling routine.

While an exemplary optimum bump processing subroutine 800 that locates a destination location for a bumped graphical component has been described above, this description should be taken as illustrative and not limiting. Those of ordinary skill in the art and others will appreciate that other optimum bump processing techniques may be used without departing from the spirit and scope of the present invention. For example, other weighting values and priorities may be used when determining an optimum destination for bumping a graphical component. In one alternate embodiment of the present invention, toolbars are less important than white space, and accordingly would have a lower bump value increment associated with them than the increment assigned to white space rectangles. In still further embodiments of the present invention, users may set and/or modify the priorities of different types of rectangles to refine a preferred rating of possible bumping destinations. In yet still further embodiments of the present invention, other components than those previously listed (windows, white space, open space, toolbars, icons, etc.) may be used when determining rectangles for weighting as potential bump locations. In still other embodiments of the present invention, a bumped graphical component may expand to fill a rectangle of an optimum bump location that the graphical component has been bumped to.

While illustrated embodiments of the invention have been illustrated and described, it will be appreciated that various changes can be made therein without departing from the spirit and scope of the invention.

The embodiments of the invention in which an exclusive property or privilege is claimed are defined as follows:

1. A computer-implemented method of moving a window from one location to another location in a graphical interface, the method comprising:
   in response to the selection of a window, automatically determining, without further user input, if said window is to be moved from the current location of the window to another location;
   if said window is to be moved, automatically determining, without further user input, except for direction, a destination location for said window, said destination location comprising an open location in said graphical interface; and
   moving, in a single step, said window from the current location of the window to said destination location.

2. The method of claim 1, further comprising receiving a desired direction for said destination.

3. The method of claim 1, wherein determining a destination location for said window comprises weighting a plurality of possible locations based on the characteristics of said plurality of locations and selecting said destination location based on said weighting.

4. The method of claim 1, further comprising determining that said destination is located in a display region with a new resolution, and automatically resizing said window in proportion to said new resolution.

5. The method of claim 1, wherein said window is selected by an input device.

6. The method of claim 1, wherein determining if said window is to be moved is based on a signal from an input device.

7. The method of claim 6, wherein said signal from an input device includes a desired direction to move said window.

8. The method of claim 1, wherein determining a destination location for said window comprises determining a destination location that lies a predetermined distance from the current location of the window.

9. The method of claim 1, wherein determining a destination location for said window comprises determining the current location of the window on a current display region, and designating an analogous location of another display region as said destination location.

10. The method of claim 9, wherein said current display region is located on one display and said other display region is located on another display.

11. The method of claim 10, wherein said analogous location is located at substantially the same pixel coordinates as the pixel coordinates of said current location.

12. The method of claim 10, wherein said analogous location is proportionately distant from the edges of said other display region as said current location is from the edges at said current display region.

13. The method of claim 9, further comprising shifting said window if said window does not fit within said other display region.

14. The method of claim 1, further comprising resizing said window to fit within said open location.

15. The method of claim 1, wherein said open location is a portion of a display region having no blocking graphical components.

16. The method of claim 15, wherein said blocking graphical components include the information bearing portions of other graphical components.

17. The method of claim 15, wherein said blocking graphical components include other graphical components accessed within a predetermined time period prior to determining a destination location for said window.

18. The method of claim 1, wherein said open location is at least the size of said window.

19. The method of claim 1, wherein moving said window comprises animating the movement of said window to said destination location.

20. The method of claim 1, further comprising displaying an indication of said destination location.

21. A computer-readable media containing computer-executable instructions for performing the method of any of claims 1, 3, 4, 8, 9, 20 or 3.

22. A computer system having a processor and a memory storing computer-executable instructions operative to perform the method of any of claims 1, 3, 4, 8, 9, 20 or 3.

23. In a computer system having a graphical user interface including a display and a user interface control device, a method of moving a window from one region of the display to another region of the display, said method comprising:
   in response to user input received from said interface control device selecting the window, automatically determining, without further user input, that a window on said display is to be moved to another location;
   automatically identifying, without further user input, except for direction, an open destination location on said display for said window to be moved; and
   automatically moving, in a single step, said window to said destination location on said display.

24. The method of claim 23, wherein said window is moved to an optimal open destination on said display.

25. The method of claim 24, wherein said optimal open destination is located according to predetermined criteria.

26. The method of claim 25, wherein said optimal open destination is located according to weighted values of potential open destinations.

27. The method of claim 25, wherein said window expands to fill the area of said optimal open destination.

* * * * *